(12) United States Patent
Burghard et al.

(10) Patent No.: US 11,437,891 B2
(45) Date of Patent: Sep. 6, 2022

(54) POSITION DETERMINATION IN A HIGH-PRESSURE CHAMBER

(71) Applicant: Siemens Aktiengesellschaft, Munich (DE)

(72) Inventors: Matthias Johannes Burghard, Berlin (DE); Joachim Denk, Berlin (DE); Marco Festa, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/599,353

(22) PCT Filed: Feb. 17, 2020

(86) PCT No.: PCT/EP2020/054039
§ 371 (c)(1),
(2) Date: Sep. 28, 2021

(87) PCT Pub. No.: WO2020/200564
PCT Pub. Date: Oct. 8, 2020

(65) Prior Publication Data
US 2022/0094244 A1  Mar. 24, 2022

(30) Foreign Application Priority Data
Mar. 29, 2019  (EP) ..................... 19166193

(51) Int. Cl.
*H02K 11/21* (2016.01)
*G01D 5/14* (2006.01)

(52) U.S. Cl.
CPC ............... *H02K 11/21* (2016.01); *G01D 5/14* (2013.01)

(58) Field of Classification Search
CPC .......... H02K 11/21; G01D 5/14; G01D 11/30; G01D 11/24
(Continued)

(56) References Cited

U.S. PATENT DOCUMENTS

| 3,859,847 A | 1/1975 | Ronemus |
| 3,977,072 A * | 8/1976 | Schonstedt ............ G01V 3/081 336/92 |

(Continued)

FOREIGN PATENT DOCUMENTS

| RU | 2404411 C1 | 11/2010 |
| WO | WO 2008101005 A1 | 8/2008 |

OTHER PUBLICATIONS

PCT International Examination Report and Written Opinion of International Examination Authority dated Jun. 10, 2020 corresponding to PCT International Application No. PCT/EP2020/054039 filed Feb. 17, 2020.

*Primary Examiner* — John K Kim
(74) *Attorney, Agent, or Firm* — Henry M. Feiereisen LLC (57) ABSTRACT

Apparatus for determining a position of a movable object in a high pressure chamber includes a housing configured to delimit the high-pressure chamber and a carrier unit having an object-facing stationary end and a flexible region arranged between the stationary end and a region that extends through the housing. The flexible region is formed by a section of a guiding tube in the form of a tube spiral. A detecting unit is received in the carrier unit and includes a sensor for detecting a position of the object and outputting a position signal, and a sensor cable guided out of the high pressure chamber through the guiding tube and through the region for relaying the position signal to an evaluating unit. The sensor is arranged stationary in the high pressure chamber on the stationary end of the carrier unit.

13 Claims, 3 Drawing Sheets

(58) Field of Classification Search
USPC .......................................................... 310/68 B
See application file for complete search history.

(56) References Cited

U.S. PATENT DOCUMENTS

| | | | | |
|---|---|---|---|---|
| 4,066,949 | A | | 1/1978 | Condrac |
| 4,164,864 | A | * | 8/1979 | Feller ..................... G01D 11/30 |
| | | | | 73/112.01 |
| 5,006,797 | A | * | 4/1991 | Smith ....................... G01P 1/00 |
| | | | | 324/262 |
| 10,132,315 | B2 | * | 11/2018 | Lehmann ................ F04C 28/28 |
| 2010/0000299 | A1 | | 1/2010 | Maurer |
| 2011/0149300 | A1 | | 6/2011 | Takeda |
| 2013/0156071 | A1 | * | 6/2013 | Wan ....................... H02K 11/25 |
| | | | | 374/E7.018 |
| 2016/0153575 | A1 | * | 6/2016 | Sohn ....................... F03G 7/065 |
| | | | | 310/306 |
| 2022/0094244 | A1 | * | 3/2022 | Burghard et al. ...... G01D 11/30 |

\* cited by examiner

POSITION DETERMINATION IN A HIGH-PRESSURE CHAMBER

CROSS-REFERENCES TO RELATED APPLICATIONS

This application is the U.S. National Stage of International Application No. PCT/EP2020/054039, filed Feb. 17, 2020, which designated the United States and has been published as international Publication No. WO 2020/200564 A1 and which claims the priorty of European Patent Application, Serial No. 19166193.3, filed Mar. 29, 2019, pursuant to 35 U.S.C. 119(a)-(d).

BACKGROUND OF THE INVENTION

The invention relates to an apparatus for determining a position of a movable object in a high pressure chamber. The invention furthermore relates to a use of the apparatus, Apparatuses of this type are known from the prior art. For example, sensors having flexible electrical cables are used to determine the position of gas-cooled electric motors. The flexible cables consist for example of an arrangement of multiple to many thin wires that are twisted together (also referred to as stranded wire). The stranded wire is surrounded by an insulator for electrical insulation. Hollow spaces typically form between the wires of a stranded wire and also between the insulator and the stranded wire and said hollow spaces are filled with air. If a flexible cable of this type is operated in a gas atmosphere, in particular in a high pressure chamber, gas can penetrate into the hollow spaces owing to diffusion processes until a gas pressure in the hollow space is equal to the gas pressure of the external gas atmosphere.

In the case of a pressure reduction in the high pressure chamber, the gas pressure only drops particularly slowly in the described hollow spaces as long as this process is furthermore based on diffusion. This differential pressure can damage the insulation of the flexible cable. It is possible to arrange the cables within an elastomer tube or a metal corrugated tube for example to reduce a risk of such damage, wherein the tubes are filled with fluid. Furthermore, it is known to use immersion tubes, wherein the sensor is located on one end of an immersion tube and the cables of said sensor are placed in a low pressure region within the immersion tube.

U.S. Pat. No. 4,066,949 A discloses a probe holder arrangement having a probe holder that is mounted in a supporting structure in a self-supporting manner. The supporting structure comprises an in general elongated cylindrical housing. An elongated free end of the holder extends essentially coaxially within the housing. The holder has a pair of spaced grooves that extend in the circumferential direction and said grooves are embodied on the outer surface of said holder in the vicinity of the free end of the holder. An elastic ring is arranged in each of the grooves, wherein the outer surface of each ring is in contact with the inner surface of a housing section in order to form an elastic supporting structure for the holder within the housing.

U.S. Pat. No. 3,859,847 A discloses a vibration monitoring apparatus having a shaft rider for monitoring the radial vibrational movement of a rotating shaft. The shaft rider is pre-tensioned with a coil spring against the circumference of the shaft. An accelerometer is arranged on the shaft rider near to the shaft to measure the vibrations. An acceleration signal is transmitted from the accelerometer to an electronic module on the upper or outer part of a bearing cover and the shaft rider, the coil spring and the accelerometer are arranged in said bearing cover.

The object of the invention is to provide an apparatus, which is improved with respect to the prior art, for determining a position of a movable object that is located in a high pressure chamber. The object of the invention is furthermore to specify a use for the apparatus.

SUMMARY OF THE INVENTION

With regard to the apparatus, the object is achieved in accordance with the invention by an apparatus as set forth hereinafter.

Advantageous embodiments of the invention are the subject matter of the dependent claims.

An apparatus in accordance with the invention for determining a position of a movable object in a high pressure chamber and said apparatus comprises a detecting unit, which has at least one sensor for detecting the position of the object and outputting a position signal that signals the position of the object, and a sensor cable for relaying the position signal to an evaluating unit that is arranged in particular in a low pressure chamber that is located outside the high pressure chamber. The apparatus furthermore comprises a carrier unit for receiving the detecting unit. The sensor in this case is arranged on an end of the carrier unit that is facing the object and that is arranged stationary in the high pressure chamber, wherein the carrier unit has a flexible region that is arranged between the stationary end and a region that is guided through a housing that delimits the high pressure chamber, and wherein the sensor cable of the detecting unit is guided out of the high pressure chamber through the flexible region and through the region that extends through the housing.

The apparatus in accordance with the invention uses the so-called immersion tube principle, wherein the carrier unit that is embodied as an immersion tube is divided into three regions.

A first region comprises the stationary end with the sensor that is provided to detect the position of the object, in particular the absolute position of the object in the high pressure chamber, and said sensor simultaneously forms a pressure barrier between the high pressure chamber and an inner chamber of the carrier unit. The inner chamber of the carrier unit consequently forms a low pressure region. The sensor comprises for example a sensor head and a sensor carrier, wherein the sensor carrier receives the sensor head. The sensor carrier is positioned with the sensor head as close as possible to a surface of the object and said sensor carrier is arranged stationary in the high pressure chamber. In the case of the described apparatus, the sensor head is consequently positioned in the high pressure chamber, wherein the sensor cables extend in the low pressure region.

A second region comprises the flexible region and is arranged between the first and a third region. The sensor cables are arranged in the flexible region and are guided via the third region out of the housing. The flexible region renders it possible for the sensor cables to be mechanically flexible without the absolute position of the sensor in the high pressure chamber and also a position of the third region being changed.

The third region is stationary like the first region, in particular stationary in relation to the housing, and is used as a sealing arrangement of the carrier unit in the housing.

The apparatus that is embodied in this manner renders it possible to precisely measure an absolute position of the object in the high pressure chamber. Owing to the flexible region, thermal linear deformations of the carrier unit do not have any or at least only have an insignificantly small influence on the detection of the position. Moreover, transmissions of vibrations from the region of the housing to the sensor are reduced by means of the flexible region. Furthermore, the apparatus renders it possible to mount/dismount the sensor in a simple manner through an opening in the housing and the third region of the carrier unit is guided through said opening. Additional openings are not required for the mounting/dismounting.

In one embodiment, the flexible region forms a tension spring or pressure spring in relation to the length of said flexible region. The flexible region can consequently shorten or lengthen, wherein the absolute position of the stationary end of the carrier unit, said end receiving the sensor, remains unchanged in the high pressure chamber and also the position of the carrier unit remains unchanged in the housing. A thermal influence, in particular a thermal linear deformation of the carrier unit, can therefore be compensated at the sensor.

For example, the flexible region extends starting from the stationary end in a straight line in the direction of the housing and has a mechanically flexible material. In particular, a material of a shell surface that delimits the inner low pressure region of the carrier unit is formed from a mechanically flexible material. It is possible by means of the material for the flexible region to expand or shorten under thermal influence. For example, the material expands in the case of heat and accordingly retracts in the case of heat deprivation. For this purpose, the carrier unit is embodied for example as a metal corrugated tube. The sensor cable that extends within the flexible region, and also the stationary positions of the other regions of the carrier unit are not influenced by said corrugated tube.

In the case of another embodiment, the flexible region is formed by a section, which is embodied as a tube spiral, of a guiding tube and the sensor cable is guided through said guiding tube, wherein the section that is embodied as a tube spiral can be arranged around and/or in a carrier tube, in particular around a rigid and/or in a rigid carrier tube. The section that is embodied as a tube spiral renders it possible to provide an elastic structure in a compact configuration. The carrier tube is used so as to secure the stationary position of the sensor in the high pressure chamber.

The section that is embodied as a tube spiral is in particular fastened to the and/or in the carrier tube in a flexible manner. For example, the section is fastened to the and/or in the carrier tube by means of clamps or crosspieces whereby it is possible to compensate vibrations that are transmitted to the carrier tube. The guiding tube that comprises this section can be arranged in this case either in part around the carrier tube or entirely within the carrier tube. For example, the respective ends of the guiding tube that are not embodied in a spiral manner are arranged within the carrier tube. The section that is embodied as a tube spiral is arranged outside the carrier tube around said carrier tube. The carrier tube accordingly comprises openings or cut-outs for guiding the guiding tube through. If the guiding tube is arranged entirely within the carrier tube, a diameter of the carrier tube can be greater in the region of the section that is embodied as a tube spiral than in the other regions. The diameter of the carrier tube can taper in the region of the sensor due to a lack of space. Moreover, in this case it is possible to omit openings or cut-outs in the carrier tube.

In one exemplary embodiment, the sensor is fastened to one end of the guiding tube, wherein this end is arranged within the carrier tube. This renders it possible to fasten the sensor and to secure the stationary position.

The sensor can be fastened to the guiding tube by means of welding, adhesive bonding or screws, in particular by means of a cutting ring fitting. The sensor can alternatively also be located in the interior of a chamber, wherein the sensor head protrudes from this chamber and wherein the sensor is not directly welded to the guiding tube.

The one end of the guiding tube is provided for example into the chamber at a specific site and for example is sealed by means of a screw connection that is secure under high pressure, for example a cutting ring fitting or clamping ring screw connection. In this case, a pressure acts on a sensor head rear side that is arranged in the housing and said pressure is equivalent to a pressure that is prevailing within the guiding tube, in particular a pressure of the ambient air.

In a further exemplary embodiment, the carrier tube is spring loaded. A simple mounting arrangement of the apparatus is thereby rendered possible since a mechanical connection of the sensor to the sensor carrier is not required, The sensor is pressed onto the sensor carrier by means of the spring loaded carrier tube. For example, for this purpose an end of the carrier tube that is remote from the sensor is influenced using a spring force, wherein the spring force is generated by means of a spring, for example a torsion spring. The spring can be tensioned by means of a spring damping nut.

In one embodiment, the guiding tube is guided through the housing and is connected to the housing by means of a flange in a positive-locking and/or non-positive locking and/or integrally bonded manner. The guiding tube in this case is not directly connected to the housing but rather is fastened to the flange that is connected, for example screwed, to the housing. For example, the guiding tube is screwed to the flange. Alternatively, the guiding tube can also be welded to the flange. The sensor can be mounted/dismounted in the case of a dosed housing by means of fastening the guiding tube to the flange.

In particular, the flange is sealed with respect to the housing. For example, for this purpose a sealing material is attached to a surface side of the flange and/or to the housing. Graphite is suitable as a sealing material and said graphite renders it possible to withstand high temperatures, renders possible a high degree of resistance to media and renders possible a highly secure mounting arrangement.

The invention furthermore provides a use of the apparatus in accordance with the invention for determining a position of a rotatable shaft that is magnetically mounted in a high pressure chamber. For example, the shaft is a component of a gas-cooled electric motor or generator. The shaft can furthermore be a component of a machine and aggressive gas, fluids or particle flows are provided in the housing of said machine.

BRIEF DESCRIPTION OF THE DRAWING

The above-described characteristics, features and advantages of this invention and also the type and manner in which these are achieved become clearer and more explicitly understandable in connection with the following description of exemplary embodiments that are further explained in connection with the drawings. In this case, in the drawings.

DETAILED DESCRIPTION OF PREFERRED EMBODIMENTS

Parts that correspond to one another are provided with identical reference numerals in the figures.

Figure 1:
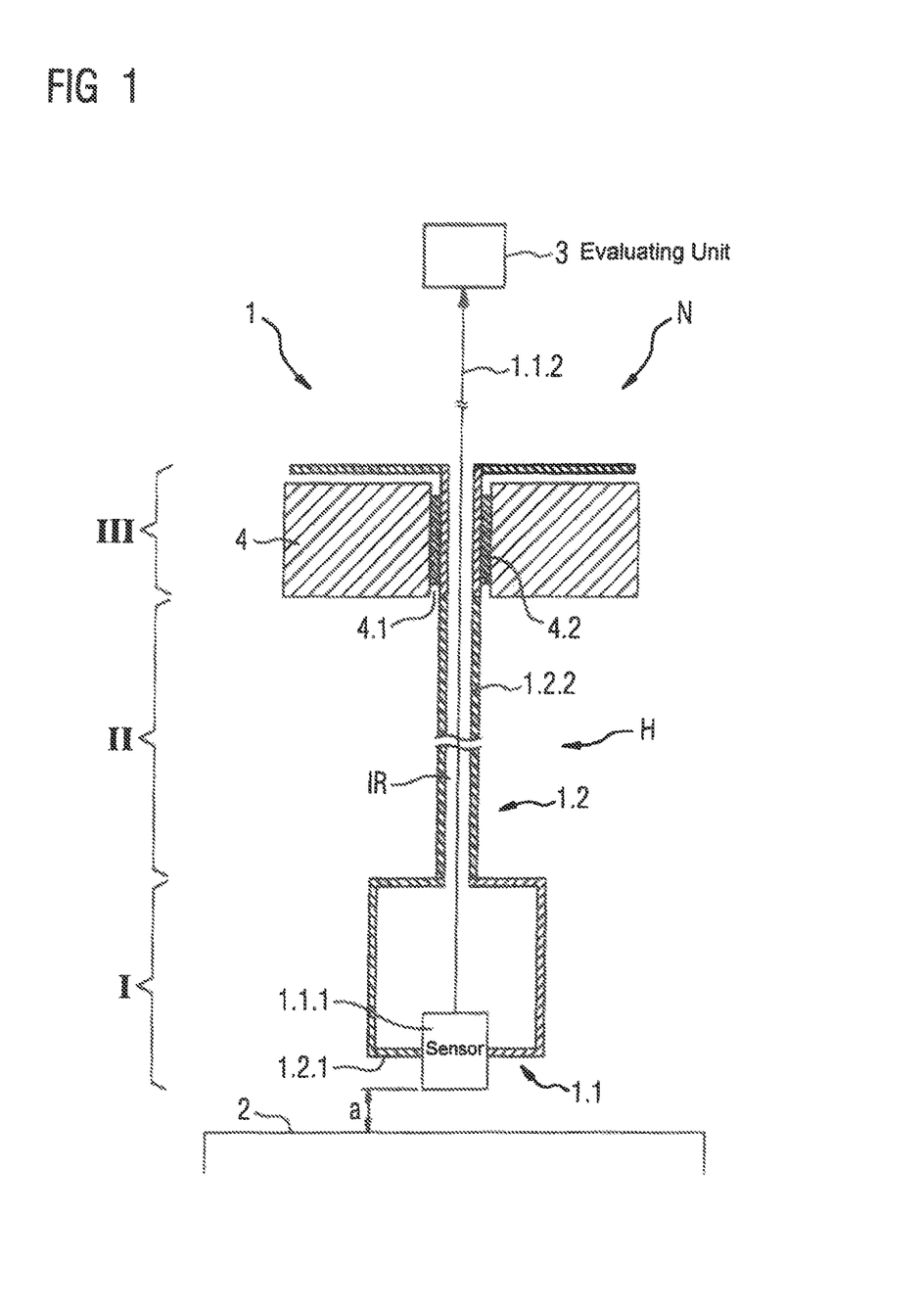
FIG. 1 shows a schematic sectional view of an exemplary embodiment of an apparatus for determining a position of a movable object in a high pressure chamber.

FIG. 1 illustrates a sectional view of an apparatus 1 for determining a position of a movable object 2 in a high pressure chamber H.

The apparatus 1 is used in particular to determine an absolute position of the object 2 in a high pressure gas atmosphere. The object 2 is for example a rotatable shaft that is magnetically mounted and that is a component of a gas-cooled electric motor or generator. It is also feasible that the object 2 is a component of a machine that is exposed to aggressive gases, fluids or particle flows in the high pressure chamber H. The determination of the position of the object 2 in the high pressure chamber H is used for an optimal operation of the electric motor/generator or the machine and also other components and/or functions that are coupled to said machine.

The apparatus 1 that is illustrated in FIG. 1 comprises a detecting unit 1.1 and a carrier unit 1.2. The detecting unit 1.1 comprises a sensor 1.1.1 that is used to detect a position signal of the object 2 in the high pressure chamber H. The sensor 1.1.1 can be embodied as an inductive sensor, capacitive sensor, optical sensor, an ultrasonic sensor, a magnet sensor and more of the like. In particular, the sensor 1.1.1 is an eddy current sensor. In this case, a contactless, dynamic detection of the absolute position of the object 2 in the high pressure chamber H is possible by means of the sensor 1.1.1.

The detecting unit 1.1 furthermore comprises a sensor cable 1.1.2 for relaying the position signal to an evaluating unit 3. The evaluating unit 3 is a control device for example and in accordance with the current exemplary embodiment is arranged in a low pressure chamber N and therefore outside the high pressure chamber H.

The sensor cable 1.1.2 comprises for example in a manner that is not illustrated in detail an arrangement of multiple to many thin wires that are connected to one another, in particular are stranded, to form a so-called stranded wire. If the sensor cable 1.1.2 is a coaxial cable, this cable comprises at least one further conductor that is arranged concentrically about the insulated stranded wire. The further conductor is likewise embodied as a multi-wired stranded wire. This renders it possible for the sensor cable 1.1.2 to be mechanically flexible.

Hollow spaces that are filled with air typically form between the wires of the stranded wire and also between the insulator and the stranded wire. If the sensor cable 1.1.2 is operated in a gas atmosphere, in particular in the high pressure chamber H, it is possible for gas to penetrate into the hollow spaces owing to diffusion processes until a gas pressure in the hollow space is identical to the gas pressure of the outer gas atmosphere, in other words in the high pressure chamber H.

In the case of a pressure reduction in the high pressure chamber H, the gas pressure only drops particularly slowly in the described hollow spaces as long as this process is furthermore based on diffusion. This differential pressure can damage the insulation of the sensor cable 1.1.2, The sensor cable 1.1.2 is guided in the carrier unit 1.2 out of the housing 4 to reduce a risk of such damage.

The carrier unit 1.2 is embodied as an immersion tube and comprises three regions I, II, III.

The sensor 1.1.1 is arranged in a first region I of the carrier unit 1.2 and said sensor is provided in addition to detect the position of the formation of a pressure barrier between the high pressure chamber H and an interior IR of the carrier unit 1.2. The interior IR of the carrier unit 1.2 in this case forms a low pressure region with respect to the high pressure chamber H.

The sensor 1.1.1 is arranged on, in particular fastened to, a free end 1.2.1 of the carrier unit 1.2 and protrudes from this free end in the direction of the object 2. In particular, the sensor 1.1.1 is arranged at a distance a with respect to the object 2 with the result that the position signal is detected in a contactless manner.

The free end 1.2.1, which receives the sensor 1.1.1, of the carrier unit 1.2 is furthermore stationary in the high pressure chamber H. In particular, the sensor 1.1.1 is fixedly received, in particular pressed onto or screwed, in a sensor carrier 1.1.1.2 that is illustrated in detail and described in FIG. 2. An absolute position of the sensor 1.1.1 is consequently fixed in the high pressure chamber H. The sensor cable 1.1.2 extends in the low pressure region of the carrier unit 1.2. It is therefore possible to avoid or at least significantly reduce gas diffusion processes as described above.

In a second region II, the carrier unit 1.2 is embodied as mechanically flexible with respect to the first region I and a third region III. In other words: the carrier unit 1.2 comprises a flexible region 1.2.2 that is arranged between the sensor 1.1.1 and a housing 4, for example an electric motor housing, and said housing delimits the high pressure chamber H. Furthermore, the sensor cable 1.1.2 is arranged in the flexible region 1.2.2 and said sensor cable is guided via the third region III out of the high pressure chamber H.

In order to embody the carrier unit 1.2 in a flexible manner in the second region II, this carrier unit comprises a mechanically flexible material that compensates thermal linear deformations of the apparatus 1. For this purpose, the carrier unit 1.2 is embodied for example as a metal corrugated tube, The flexible region 1.2.2 therefore behaves according to a tension spring or pressure spring without the absolute position of the sensor 1.1.1 in the high pressure chamber H being changed. In particular, a position of the sensor 1.1.1 and also a position of the carrier unit 1.2 in the third region III is not changed or is only insignificantly changed in the case of a linear deformation of the flexible region 1.2.2. The carrier unit 1.2 in the first and third region I, III has as rigid a material as possible, for example a metal or plastic.

The carrier unit 1.2 is guided out of the housing 4 in the third region III. For this purpose, the housing 4 comprises a cut-out 4.1 having a sealing region 4.2 that seals the carrier unit 1.2 in the housing 4. For example, graphite is used for the sealing arrangement and said graphite offers a high resistance to temperature, a high degree of resistance to media and a highly secure mounting arrangement. Furthermore, this renders it possible to mount/dismount the sensor 1.1.1 in a simple manner through the cut-out 4.1. Additional openings are not required for the mounting/dismounting of the sensor 1.1.1.

The carrier unit 1.2 is stationary in the third region III, in particular stationary in relation to the housing 4. The position of the carrier unit 1.2 is consequently not changed or is only insignificantly changed in the third region III in the case of a change in length of the carrier unit 1.2 in the flexible region 1.2.2.

The flexible region 1.2.2 consequently renders it possible to compensate changes in length of the carrier unit 1.2, which result in particular from thermodynamic influences in the high pressure chamber H. The position of the sensor 1.1,1 is consequently not changed or is only insignificantly changed in the high pressure chamber H. This renders it possible to precisely measure an absolute position of the object 2 in the high pressure chamber H. Moreover, the sensor cable 1.1.2 extends in a low pressure region within the carrier unit 1.2 so that pressure changes in the high pressure chamber H do not exert any or at least only exert an insignificantly small influence on a pressure within the sensor cable 1.1.2. The risk of damaging the sensor cable 1.1.2 is therefore minimized.

Furthermore, transmissions of vibrations from the region of the housing 4 to the sensor 1.1.1 can be reduced by means of the flexible region 1.2.2.

Figure 2:
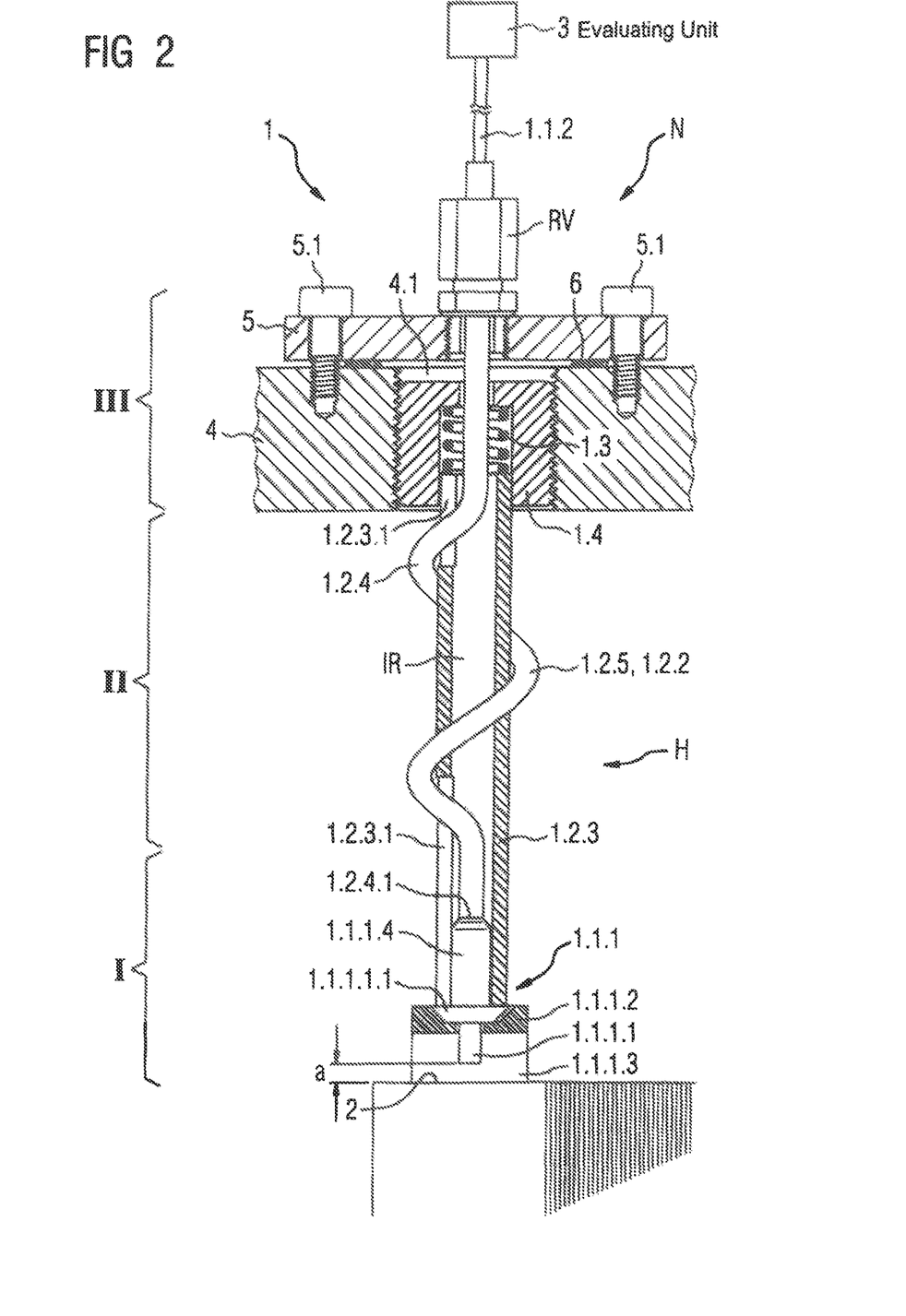
FIG. 2 shows a schematic sectional view of an alternative exemplary embodiment of the apparatus and FIG. 3 shows a schematic sectional view of an enlarged section of a further alternative exemplary embodiment of the apparatus.

FIG. 2 illustrates an alternative exemplary embodiment of the apparatus 1 in a sectional view.

The apparatus 1 comprises the detecting unit 1.1 and the carrier unit 1.2 in a similar manner to the exemplary embodiment that is illustrated in FIG. 1 and said carrier unit is inserted through the cut-out 4.1 of the housing 4 into the high pressure chamber H. However, in this case the carrier unit 1.2 is embodied in a two-part manner and comprises an essentially rigid carrier tube 1.2.3 and a guiding tube 1.2.4. The carrier tube 1.2.3 is embodied in the form of a tube stamp. The carrier tube 1.2.3 and the guiding tube 1.2.4 are in each case embodied as hollow and for example are formed from metal. The guiding tube 1.2.4 receives the sensor cable 1.1.2 and is divided into three regions I to III in accordance with the carrier unit 1.2 that is described in FIG. 1

In a similar manner to the exemplary embodiment in FIG. 1, the sensor 1.1.1 is arranged in the first region I. In particular, the sensor 1.1.1 is fastened to an end 1.2.4.1 of the guiding tube 1.2.4. The sensor 1.1,1 is illustrated in detail in this case and comprises a sensor head 1.1.1.1 and the sensor carrier 1.1.1.2 that receives the sensor head 1.1.1.1. In an alternative exemplary embodiment that is not illustrated, the sensor 1.1.1 can also be located in the interior of a chamber, wherein the sensor head 1.1.1.1 protrudes from this chamber. The end 1.2.4.1 of the guiding tube 1.2,4 is inserted in this case into the chamber for example at a specific site and for example is sealed by means of a screw connection that is secure under high pressure, for example a cutting ring fitting or damping ring screw connection. In this case, a pressure acts upon a sensor head rear side and said pressure is equivalent to a pressure that is prevailing within the guiding tube 1.2.4, in particular a pressure of the ambient air.

The sensor head 1.1.1.1 comprises for example one or multiple eddy current sensors for detecting the position signal of the object 2. For this purpose, the sensor head 1.1.1.1 is positioned at a distance a with respect to the surface of the object 2 and is arranged stationary in the high pressure chamber H. Since the position signal is dependent upon the distance a, the absolute position of the object 2 can be detected by means of the sensor 1.1.1 in a contactless manner. The sensor head 1.1.1.1 protrudes from a sensor housing 1.1.1.4 in the direction of the object 2, wherein in the illustrated exemplary embodiment the sensor head 1.1.1.1 protrudes starting from an edge of the sensor carrier 1.1.1.2, which in this case is illustrated as a section through a ring, into a region 1.1.1.3 of the sensor carrier 1.1.1.2 in the direction of the object 2.

The sensor housing 1.1.1.4 is embodied as cylindrical in accordance with the illustrated exemplary embodiment and has a collar 1.1.1.1.1 on a region that lies in the direction of the sensor head 1.1.1.1 and the diameter of said collar is enlarged with respect to a diameter of the sensor housing 1.1.1.4 and the sensor head 1.1.1.1. Alternatively, dimensions of the collar 1.1.1.1.1 without an enlarged diameter with respect to the sensor housing 1.1.1.4 are also possible. In a manner that is not illustrated in detail, the sensor housing 1.1.1.4 comprises a contact element for electrically contacting the sensor head 1.1.1.1 using the sensor cable 1.1.2 and consequently for relaying the position signal to the evaluating unit 3.

The sensor carrier 1.1.1.2 forms a mechanical carrier for the sensor housing 1.1.1.4 and positions the sensor head 1.1.1.1 in a stable and stationary manner in the high pressure chamber H. The sensor carrier 1.1.1.2 has a cut-out that corresponds to the collar 1.1.1.1.1, wherein the collar 1.1.1.1.1 rests loosely on the sensor carrier 1.1.1.2, and wherein the sensor head 1.1.1.1 protrudes through the sensor carrier 1.1.1.2 in the direction of the object 2 and wherein the sensor head 1.1.1.1 is pressed by means of the carrier tube 1.2.3 onto the sensor carrier 1.1.1.2. This is further described at a later point.

Alternatively, the sensor 1.1.1 can be screwed to the sensor carrier 1.1.1.2. For this purpose, the sensor 1.1.1 has an outer thread and the sensor carrier 1.1.1.2 has an inner thread and said outer thread and inner thread engage into one another in a positive-locking and non-positive locking manner. In this case, the sensor 1.1.1 is screwed by means of a socket wrench to the sensor carrier 1.1.1.2 so as to mount the sensor 1.1.1. In the case of this embodiment variant, the arrangement of the carrier tube 1.2.3, the spring element 1.3 and the tensioning element 1.4 is not required.

Furthermore, the sensor 1.1.1 is fastened to the rear side of the guiding tube 1.2.4. In particular, the sensor housing 1.1.1.4 is welded to the rear side of guiding tube 1.2.4. Alternatively, the sensor head 1.1.1.1 can also be adhesively bonded or screwed to the guiding tube 1,2.4 (cf. FIG. 3). Furthermore, the guiding tube 1.2.4 can also be fastened in/to the sensor carrier 1.1.1.2, for example by means of a sealed screw connection.

The end 1.2.1 of the carrier unit 1.2, here the guiding tube 1.2.4, which receives the sensor 1.1.1, is arranged within the carrier tube 1.2.3 and is inserted from the outside into the carrier tube 1,2.3 through an opening 1.2.3.1 that is inserted into the carrier tube 1.2.3.

In accordance with the illustrated exemplary embodiment, a section 1.2.5 of the guiding tube 1.2.4, which is embodied as a tube spiral extends outside of the carrier tube 1.2.3. This section 1.2.5 forms the flexible region 1.2.2 of the carrier unit 1.2.

The section 1.2.5 that is embodied as a tube spiral renders possible an elastic structure and is located in the second region II of the carrier unit 1.2. The rigid carrier tube 1.2.3 is used to secure the stationary position of the sensor 1.1.1 in the high pressure chamber H and also a mechanical stabilization of the guiding tube 1.2.4.

The section 1.2.5 is arranged in a spiral manner around the carrier tube 1.2.3 and is fastened to this carrier tube. For example, the section 1.2.5 is fastened by means of clamps or crosspieces (not illustrated in detail) to the carrier tube 1.2.3 whereby it is possible for vibrations that are transmitted to the carrier tube 1.2.3 to be compensated.

The section 1.2.5 can alternatively also be arranged entirely in the interior IR of the carrier tube 1.2.3, wherein in this case, a diameter of the carrier tube 1.2.3 where applicable is greater in the region of the section 1.2.5 than in other regions of the carrier tube 1.2.3. If the guiding tube 1.2.4 is arranged entirely in the interior IR of the carrier tube

1.2.3, it is possible to omit openings or cut-outs for guiding through the guiding tube 1.2.4.

The guiding tube 1.2.4 is again arranged within the carrier tube 1.2.3 in the third region III and in a similar manner to the first region 1 is guided through an opening 1,2.3.1 that is provided in the carrier tube 1.2.3. The guiding tube 1.2.4 is guided through the cut-out 4.1 of the housing 4 into the low pressure chamber N.

Furthermore, a spring element 1.3 is arranged in the third region III and said spring element influences an end of the carrier tube 1.2.3, which is arranged in the cut-out 4.1, using a spring force. In other words: the carrier tube 1.2.3 is spring loaded. It is thereby rendered possible to mount/dismount the sensor 1.1.1 in a simple manner since a mechanical connection of the sensor head 1.1.1.1 to the sensor carrier 1.1.1.2 is produced by means of the spring force. In particular, the sensor head 1.1.1.1 is pressed onto the sensor carrier 1.1.1.2 by means of the spring loaded carrier tube 1.2.3. The sensor head 1.1.1,1 and the sensor carrier 1.1.1.2 are consequently loosely connected to one another.

The spring element 1.3 is for example a torsion spring that can be tensioned by means of a tensioning element 1.4, for example a spring clamping nut. In the illustrated exemplary embodiment, the tensioning element 1.4 is arranged within the cut-out 4.1, wherein the cut-out 4.1 is enlarged with respect to the exemplary embodiment that is illustrated in FIG. 1. The tensioning element 1.4 has for example an outer thread that is not illustrated and said outer thread engages in a positive-locking and non-positive locking manner into an inner thread that is provided in the cutout 4.1. In the case of screwing the tensioning element 1.4 to the cut-out 4.1, the tensioning element 1.4 moves axially in the direction of the carrier tube 1.2.3 whereby the spring element 1.3 is tensioned.

The guiding tube 1.2.4 is guided in the third region III through the housing 4 and is connected to the housing 4 by means of a flange 5 in a positive-locking and/or non-positive locking and/or integrally bonded manner. In particular, the guiding tube 1.2.4 is fastened to the flange 5 by means of a sealing tube screw connection RV. The tube screw connection RV can comprise a cutting ring fitting or damping ring screw connection and/or a seal, for example a graphite socket.

In accordance with the illustrated exemplary embodiment, the flange 5 is screwed to the housing 4 via fastening elements 5.1, in particular screws, and has a central cut-out for guiding through the guiding tube 1.2.4, In the region of the cut-out, the guiding tube 1.2.4 is fastened to the flange 5 by means of the illustrated tube screw connection RV. Alternatively, the guiding tube 1.2.4 can also be welded to the flange 5. The fastening arrangement of the guiding tube 1.2.4 to the flange 5 renders it possible to mount/dismount the sensor 1.1.1 in the case of a closed housing 4.

The flange 6 is sealed with respect to the housing 4. For this purpose, a sealing element 6 is arranged or provided between the flange 5 and the housing 4. The sealing element 6 is formed in a similar manner to the sealing region 4.2 for example from graphite. The sealing element 6 can be attached, in particular adhesively bonded, laminated or injected onto a surface of the flange 5 that is facing the housing 4 and/or onto a surface side of the housing 4 that is facing the flange 5. In the case of the fastening arrangement of the flange 5 to the housing 4, the sealing element 6 is compressed so that the region between the housing 4 and the flange 5 is sealed. Alternatively, the sealing element 6 can also be provided after fastening the flange 5 to the housing 4 in the region between said flange and housing.

The apparatus 1 that is described here renders it possible in a similar manner to the apparatus 1 in FIG. 1 to compensate changes in length of the carrier unit 1.2, which result in particular from thermodynamic influences in the high pressure chamber H. In particular, in this case the section 1.2.5 that is embodied as a tube spiral forms the flexible region 1.2.2 that can lengthen or shorten owing to the spiral shape according to the principle of a tension spring or pressure spring. The position of the sensor 1.1.1 is consequently not changed or is only insignificantly changed in the high pressure chamber H. The position of the guiding tube 1.2.4 in the third region III is likewise not changed or only insignificantly changed.

Figure 3:
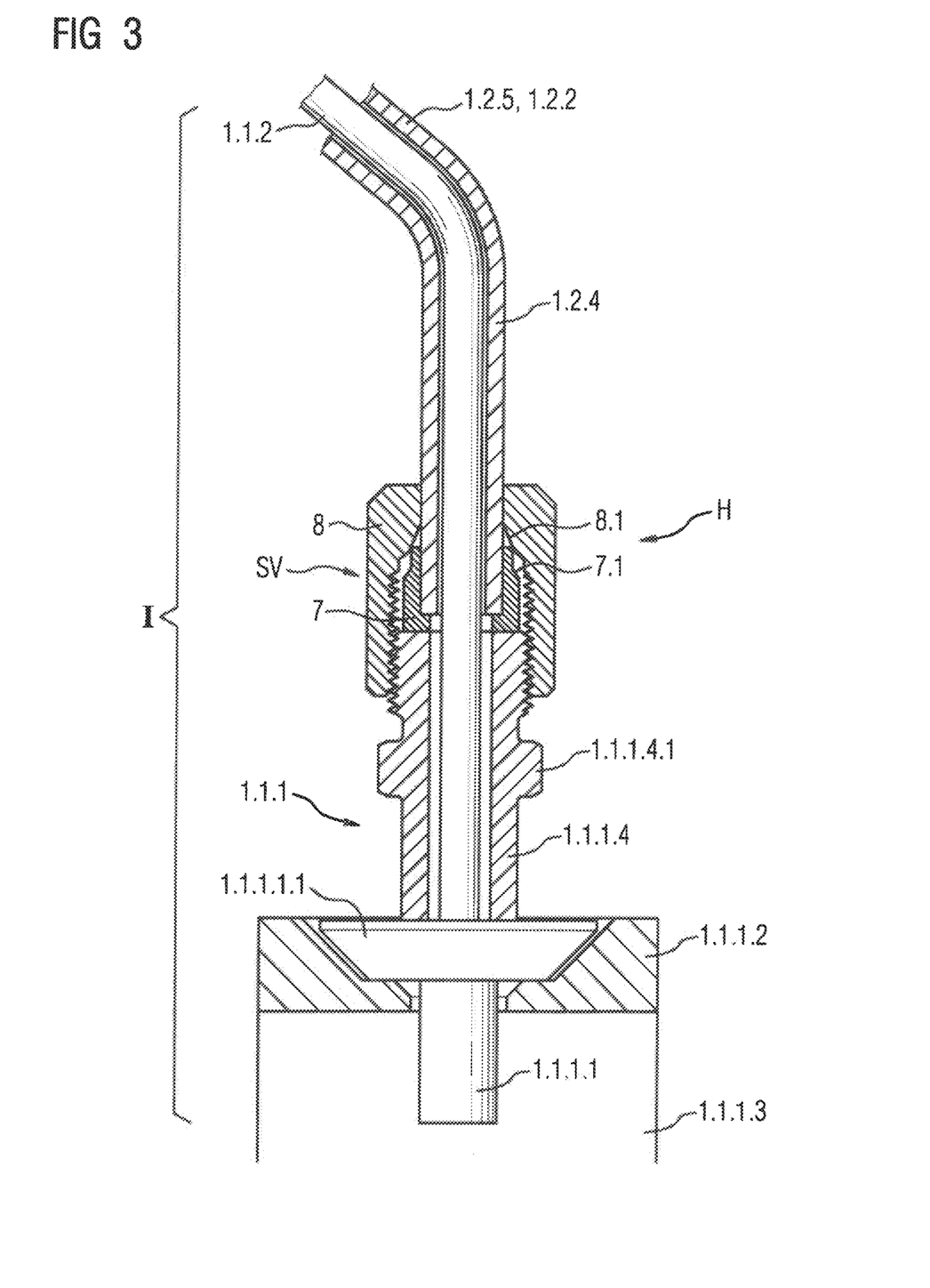

FIG. 3 illustrates a sectional view of an enlarged section of the apparatus 1 in a further alternative exemplary embodiment.

The illustrated section illustrates the first region I of the carrier unit 1.2 in detail and said carrier unit in a similar manner to the carrier unit 1.2 that is described in FIG. 2 has a guiding tube 1.2.4 having a section 1.2.5 that is embodied as a tube spiral so as to embody the flexible region 1.2.2. The carrier tube 1.2.3 is not illustrated here.

With respect to the carrier unit 1.2 that is described in FIG. 2, the sensor housing 1.1.1.4 is not welded to the guiding tube 1.2.4 but rather is connected by means of a cutting ring fitting SV to the guiding tube 1.2.4. The illustrated sensor housing 1.1.1.4 is embodied as a single part in this case. Alternatively, the sensor housing 1.1.1.4 can also consist of multiple parts that are welded to one another.

The sensor housing 1.1.1.4 has a tool access surface 1.1.1.4.1, in this case an outer hexagon. Furthermore, a cutting ring 7 is arranged on the rear side of the sensor housing 1.1.1.4 and said cutting ring encompasses an end of the guiding tube 1.2.4 and rests on an end face on the rear side end of the sensor housing 1.1.1.4. The cutting ring 7 consists in particular of a metal or a metal alloy.

Furthermore, the cutting ring 7 and the rear side end of the sensor housing 1.1.1.4 are encompassed by a union nut 8 as an actuating element, The union nut 8 has an inner thread with which this union nut can be screwed onto the sensor housing 1.1.1.4 and/or the guiding tube 1.2.4. The sensor housing 1.1.1.4 and/or the guiding tube 1.2.4 have an outer thread that corresponds to said inner thread.

In the case of mounting the apparatus 1, the union nut 8 is rotated onto, in particular screwed onto, the sensor housing 1.1.1.4 and/or the guiding tube 1.2.4 by means of a tool. In this case, the cutting ring 7 is tensioned in an axial direction whereby this cutting ring 7 deforms radially inwards and cutting edges that are arranged on the cutting ring 7 under a notch effect penetrate, in particular in a positive-locking manner, into the material of the guiding tube 1.2.4. As is illustrated in the exemplary embodiment, the cutting ring 7 has an end-side conically tapering outer conical surface 7.1 that lies against a corresponding inner conical surface 8.1 of the union nut 8. As a consequence, a wedging effect is achieved in addition to the radial compaction of the cutting ring 7.

By means of the described cutting ring fitting SV, on the one hand the guiding tube 1.2.4 is mechanically stabilized. On the other hand, a metal sealing function is achieved via the cutting ring 7. Moreover, it is possible to use a universal or structurally identical sensor 1.1.1, wherein the guiding tube 1.2.4 is produced depending upon the use.

Although the invention has been illustrated and described in detail by preferred exemplary embodiments, the invention is not limited in this regard by the disclosed examples and it is possible for the person skilled in the art to derive other variations therefrom without departing from the protective scope of the invention.

What is claimed is:

1. Apparatus for determining a position of a movable object in a high pressure chamber, said apparatus comprising:
   a housing configured to delimit the high-pressure chamber;
   a carrier unit having an object-facing stationary end and a flexible region arranged between the stationary end and a region that extends through the housing, said flexible region being formed by a section of a guiding tube in the form of a tube spiral;
   an evaluating unit; and
   a detecting unit received in the carrier unit and including a sensor for detecting a position of the object and outputting a position signal, and a sensor cable guided out of the high pressure chamber through the guiding tube and through the region for relaying the position signal to the evaluating unit, said sensor being arranged stationary in the high pressure chamber on the stationary end of the carrier unit.

2. The apparatus of claim 1, wherein the flexible region forms a tension spring or pressure spring in relation to a length of the flexible region.

3. The apparatus of claim 1, wherein the stationary end and the region have each an absolute position which remains unchanged when a length of the flexible region changes.

4. The apparatus of claim 1, wherein the carrier unit includes a carrier tube, saki section of the guiding tube being arranged around and/or in the carrier tube.

5. The apparatus of claim 4, wherein the carrier tube is rigid.

6. The apparatus of claim 4, wherein the section of the guiding tube is fastened to the carrier tube and/or fastened in the carrier tube in a flexible manner.

7. The apparatus of claim 4, wherein the sensor is fastened to an end of the guiding tube, said end of the guiding tube being arranged within the carrier tube.

8. The apparatus of claim 1, wherein the sensor is welded, adhesively bonded or screwed to the guiding tube.

9. The apparatus of claim 1, wherein the sensor is screwed via a cutting ring fitting to the guiding tube.

10. The apparatus of claim 4, wherein the carrier tube is spring loaded.

11. The apparatus of claim 1, wherein the guiding tube is guided through the housing, and further comprising a flange connecting the guide tube to the housing in a positive-locking and non-positive locking manner.

12. The apparatus of claim 11, further comprising a sealing element sealing the flange with respect to the housing.

13. The apparatus of claim 1, wherein the object is a rotatable shaft magnetically mounted in the high pressure chamber.

* * * * *

UNITED STATES PATENT AND TRADEMARK OFFICE
CERTIFICATE OF CORRECTION

| | |
|---|---|
| PATENT NO. | : 11,437,891 B2 |
| APPLICATION NO. | : 17/599353 |
| DATED | : September 6, 2022 |
| INVENTOR(S) | : Matthias Johannes Burghard, Joachim Denk and Marco Festa |

It is certified that error appears in the above-identified patent and that said Letters Patent is hereby corrected as shown below:

On the Title Page

Item (30) Foreign Application Priority Data:
Replace "EP 19166193" with the correct -- EP 19166193.3 --.

In the Claims

In Column 12, Claim 4, Line 2:
Replace "saki section" with -- said section --.

Signed and Sealed this
Twenty-fifth Day of October, 2022

Katherine Kelly Vidal
*Director of the United States Patent and Trademark Office*